June 23, 1925.

J. WILKINSON 1,543,537

DYNAMO ELECTRIC MACHINE

Filed May 2, 1922

Inventor:
James Wilkinson,
by Albert D. Davis
His Attorney.

Patented June 23, 1925.

1,543,537

UNITED STATES PATENT OFFICE.

JAMES WILKINSON, OF LYNN, MASSACHUSETTS, ASSIGNOR TO GENERAL ELECTRIC COMPANY, A CORPORATION OF NEW YORK.

DYNAMO-ELECTRIC MACHINE.

Application filed May 2, 1922. Serial No. 557,994.

*To all whom it may concern:*

Be it known that I, JAMES WILKINSON, a citizen of the United States, residing at Lynn, in the county of Essex, State of Massachusetts, have invented certain new and useful Improvements in Dynamo-Electric Machines, of which the following is a specification.

My invention relates to dynamo electric machines and particularly to the ventilation of such machines. It has for its object an efficient arrangement for the ventilation of the rotatable members of such machines.

In order to obtain the most efficient ventilating arrangement of the rotatable member of a dynamo electric machine, it is necessary that the entrance of air to the suction side of the fan shall be unobstructed, that the air leaving the delivery side of the fan shall be guided properly to the parts to be cooled and that the air shall not pass around sharp corners or over obstructions. To accomplish this my invention consists of a novel arrangement and construction of the rotatable member of a dynamo electric machine.

Figure 1:
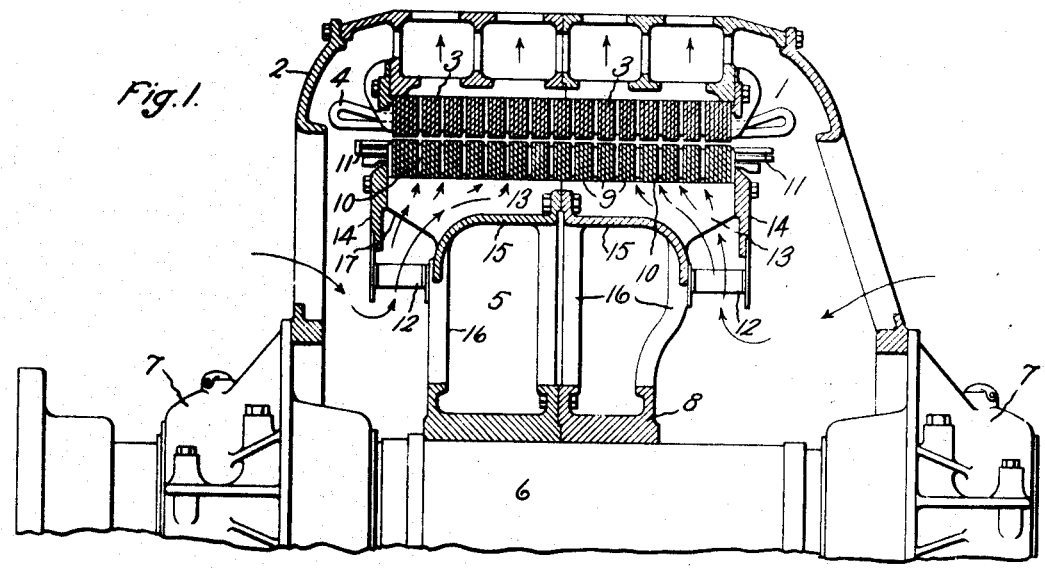
Figure 2:
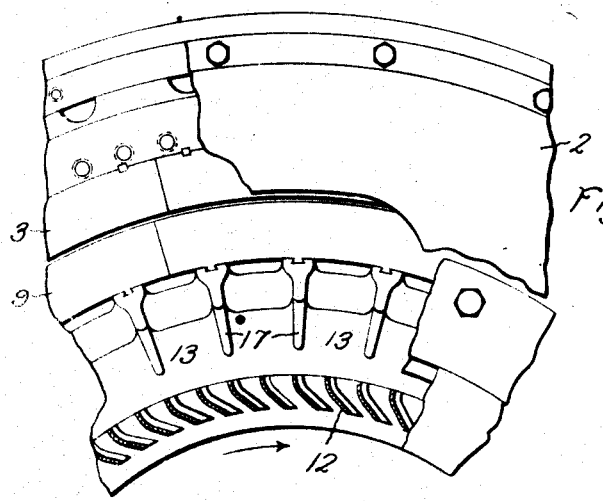
Figure 3:
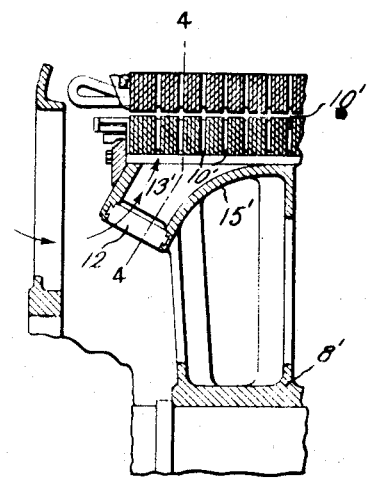
Figure 4:
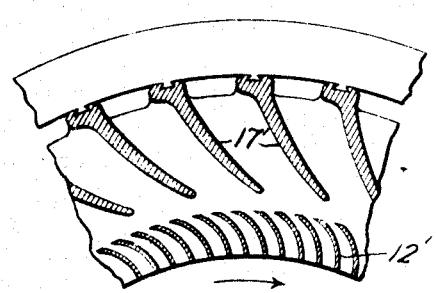

For a better understanding of my invention, reference may be had to the following description taken in connection with the accompanying drawing, in which Fig. 1 is a sectional view of a dynamo electric machine embodying my invention; Fig. 2 is an end view of the machine of Fig. 1 with parts removed; Fig. 3 is a sectional view of a portion of a dynamo electric machine embodying a modification of my invention; and Fig. 4 is a sectional view taken on the line 4—4 of Fig. 3.

In the drawings I have illustrated my invention in a dynamo electric machine of the induction type. Like reference numerals refer to like parts throughout the several figures of the drawing.

Referring to Figs. 1 and 2, 1 is a stationary member of a dynamo electric machine having the usual frame 2 supporting lamination 3 in slots in the inner periphery of which is mounted a winding 4. A rotatable member 5 is mounted on a shaft 6 journaled in bearing 7. The rotatable member 5 comprises a spider 8 on which a core consisting of laminations 9 is mounted. The laminations are assembled in bundles, the bundles being spaced apart to form a plurality of radially extending ventilating spaces 10 between the laminations. The ventilating spaces 10 are substantially uniformly spaced throughout the length of the core. In slots in the outer periphery of the laminations 9 is mounted a winding 11. Two fan members 12 are mounted on the spider 8, one at each end thereof. Enclosed passages 13 lead from the fan members 12 to the inner ends of the ventilating spaces 10. These passages are closed by the end members 14 at their ends and by the wall 15 of the spider which extends throughout the length of the passages 13. It will be seen from the drawing that these passages 13 are wider at the ends adjacent the fan members 12 and are narrower at the portions thereof adjacent the ventilating spaces 10. The wall 15 of the passages has a gradual curve so as to prevent the formation of eddy currents in the air flowing through the passages 13. The spider 8 comprises arms 16 on which are mounted ribs 17 which are spaced apart and extend in the direction of the passages 13 and parallel to the shaft 6. The laminations 9 are mounted on the ribs 17. These ribs 17 form a plurality of passages for the air from each of the fan members to the inner ends of the ventilating ducts.

It will be noted from Fig. 1 that air enters both sides of the machine through the frame 2, enters the suction side of the fan member 12, passes through the passages 13, through the ventilating spaces 10, cools the windings 11 and 4 and passes out of the machine through the ventilating spaces in the laminations 3 and out of the frame 2, as indicated by the arrows. With the arrangement shown the entrance of air to the suction side of the fans 12 is unobstructed and the air leaving the delivery side of the fans passes through the passages 13 without encountering any sharp corners or obstructions.

In the modification of my invention shown in Figs. 3 and 4, the fan members 12' are arranged at a slight angle to the shaft, whereas in the other figures the fan members 12 are arranged parallel to the shaft. Also in Figs. 3 and 4, the wall 15' of the spider is curved from the ends adjacent the fan members 12' to the center of the spider 8' thereby making the passages 13' of different shape than that shown in Fig. 1 and much narrower at the middle of the machine. In Figs. 3 and 4 also, the ribs 17' are curved in order to facilitate the entrance of air into the ventilating spaces 10', these ribs acting as fan blades and increasing the pressure of the air entering the ventilating spaces.

The direction of normal rotation of the rotatable member is indicated in Figs. 2 and 4 by arrows below these figures, but the fans are designed so that air will be efficiently forced through the ventilating spaces 10 and 10' with a direction of rotation of the rotatable member opposite to that indicated by these arrows.

I desire it to be understood that my invention is not limited to the particular arrangement shown and described, and I aim in the appended claims to cover all modifications which do not depart from the spirit and scope of my invention.

What I claim as new and desire to secure by Letters Patent of the United States is:

1. In a dynamo electric machine, a rotatable member comprising a spider having longitudinally extending ribs, said ribs being spaced apart, a core consisting of laminations mounted on said ribs and provided with slots, windings in said slots, said laminations being provided with a plurality of radially extending ventilating spaces therebetween, said ventilating spaces being substantially uniformly spaced throughout the length of said core, fan members mounted on said spider at the ends thereof, and means forming substantially enclosed passages leading from said fan members to the inner ends of said ventilating spaces, said passages being wider at the ends adjacent the fan members and narrower at the portions thereof adjacent the said ventilating spaces, said ribs of said spider being located in said passages and extending in the direction of said passages so as to form a plurality of paths for the air from each of said fan members.

2. In a dynamo electric machine, a rotatable member comprising a spider having longitudinally extending curved ribs, said ribs being spaced apart, a core consisting of laminations mounted on said ribs and provided with slots, windings in said slots, said laminations being provided with a plurality of radially extending ventilating spaces therebetween, said ventilating spaces being substantially uniformly spaced throughout the length of said core, fan members mounted on said spider at the ends thereof, and means forming substantially enclosed passages leading from said fan members to the inner ends of said ventilating spaces, said ribs of said spider being located in said passages and extending in the direction of said passages so as to form a plurality of paths for the air from each of said fan members, whereby said ribs act as fan blades to increase the pressure of the air entering said ventilating spaces.

3. In a dynamo electric machine, a rotatable member comprising a spider having longitudinally extending curved ribs, said ribs being spaced apart, a core consisting of laminations mounted on said spider and provided with slots, windings in said slots, said laminations being provided with a plurality of radially extending ventilating spaces therebetween, said ventilating spaces being substantially uniformly spaced throughout the length of said core, fan members mounted on said spider at the ends thereof, and means forming substantially enclosed passages leading from said fan members to the inner ends of said ventilating spaces, said passages being wider at the ends adjacent the fan members and narrower at the portions thereof adjacent the said ventilating spaces, said ribs of said spider being located in said passages and extending in the direction of said passages so as to form a plurality of paths for the air from each of said fan members whereby said ribs act as fan blades to increase the pressure of the air entering said ventilating spaces.

In witness whereof, I have hereunto set my hand this 29th day of April 1922.

JAMES WILKINSON.